US012735367B2

(12) United States Patent
Reinoso et al.

(10) Patent No.: US 12,735,367 B2
(45) Date of Patent: Sep. 15, 2026

(54) ENCAPSULATED FERTILIZER COMPRISING ESSENTIAL OILS, POLYMERS AND MACRONUTRIENTS AND METHOD OF PREPARATION THEREOF

(71) Applicant: YPF TECNOLOGÍA S.A., Ciudad Autónoma de Buenos Aires (AR)

(72) Inventors: Sebastián Reinoso, Berisso (AR); Aline Schneider Teixeira, Berisso (AR); Marcos Coustet, Berisso (AR); José Roberto Leunda, Berisso (AR)

(73) Assignee: YPF TECNOLOGIA S.A., Ciudad Autonoma de Buenos Aires (AR)

( * ) Notice: Subject to any disclaimer, the term of this patent is extended or adjusted under 35 U.S.C. 154(b) by 575 days.

(21) Appl. No.: 18/332,190

(22) Filed: Jun. 9, 2023

(65) Prior Publication Data

US 2023/0399272 A1 Dec. 14, 2023

Related U.S. Application Data

(60) Provisional application No. 63/350,604, filed on Jun. 9, 2022.

(51) Int. Cl.

| | |
|---|---|
| ***C05G 5/30*** | (2020.01) |
| ***C05C 9/00*** | (2006.01) |
| ***C05G 3/40*** | (2020.01) |

(52) U.S. Cl.
CPC .................. *C05G 5/37* (2020.02); *C05C 9/00* (2013.01); *C05G 3/40* (2020.02); *C05G 5/36* (2020.02)

(58) Field of Classification Search
CPC ... C05G 5/37; C05G 3/40; C05G 5/36; C05G 5/30; C05C 9/00; C05C 9/005
See application file for complete search history.

(56) References Cited

U.S. PATENT DOCUMENTS

| | | | | |
|---|---|---|---|---|
| 6,336,949 | B1 * | 1/2002 | Patra | C05C 9/005 71/64.11 |
| 2007/0163317 | A1 * | 7/2007 | Birthisel | A01N 43/82 71/64.07 |
| 2010/0011825 | A1 * | 1/2010 | Ogle | C05G 5/36 71/30 |
| 2022/0289641 | A1 * | 9/2022 | Holt | C05G 5/37 |

* cited by examiner

*Primary Examiner* — Jennifer A Smith
(74) *Attorney, Agent, or Firm* — MUNCY, GEISSLER, OLDS & LOWE, P.C.

(57) ABSTRACT

An encapsulated fertilizer comprising a core comprising a fertilizer compound in a plurality of layers comprising a fertilizer compound, a polymer, micronized sulfur and starch. A method for preparing an encapsulated fertilizer comprising four layers. The encapsulated fertilizer has a homogeneous coating of its surface, is devoid of cracks and preferential paths or channels, so that the fertilizer compound can be released to the environment in a controlled manner.

13 Claims, 9 Drawing Sheets

ENCAPSULATED FERTILIZER COMPRISING ESSENTIAL OILS, POLYMERS AND MACRONUTRIENTS AND METHOD OF PREPARATION THEREOF

CROSS REFERENCE TO RELATED APPLICATIONS

This application claims priority of U.S. Provisional Application No. 63/350,604 filed on 9 Jun. 2022 under 35 U.S.C. § 119 (e), the entire contents of which are hereby incorporated by reference.

TECHNICAL FIELD

The present invention generally relates to fertilizer compositions. Specifically, the present invention relates to an encapsulated fertilizer having a controlled release of active compounds and suitable for sustainable fertilization.

BACKGROUND

The agro-industrial sector is rapidly growing due to the increasing demand of food. Fertilizers play an essential role, as they provide the nutrients needed for plant growth.

Fertilizers generally comprise main macro nutrients such as Nitrogen (N), Phosphorus (P), and Potassium (K), with optional addition micronutrients or supplements. They may comprise only one nutrient or be multinutrient. Ammonia, ammonium nitrate and urea are fertilizer compounds widely used as sources of N.

The use of synthetic fertilizers may a negative environmental impact, in part due to residues left by these fertilizers. For this reasons, more environmentally friendly fertilizers are the object of research. Several authors have studied the properties of biodegradable fertilizers (see e.g., Liu, L., Ni, Y., Zhi, Y., Zhao, W., Pudukudy, M., Jia, Q., . . . & Li, X. *Sustainable and Biodegradable Copolymers from $SO_2$ and Renewable Eugenol: A Novel Urea Fertilizer Coating Material with Superior Slow Release Performance*, Macromolecules, 53(3), 936-945 (2020)).

Some of these fertilizers provide a controlled release of a fertilizer compound (e.g. urea). This is typically achieved by fertilizers comprising a fertilizer compound "core" or center, coated with materials providing both structural integrity as well as permeability to the fertilizer compound. It is therefore desirable that these coatings do not have a negative environmental impact, and that the structure surrounding the core is devoid of preferential paths or channels through which the fertilizer compound might migrate to the surface, i.e. causing a non-controlled release.

There is therefore a need to provide a fertilizer having a structure devoid of preferential paths or channels, providing controlled release of fertilizer compounds while also being environmentally friendly.

SUMMARY

The invention provides a solution to the shortcomings of the prior art, by providing an encapsulated fertilizer, i.e., comprising a core including a fertilizer compound, and several material layers surrounding the core, a first layer surrounding the core comprising an organic compound such as a terpene, the materials being chosen such that the obtained encapsulated fertilizer shows a homogeneous coating of its surface, devoid of cracks and, in general, devoid of preferential paths or channels. In this manner, the fertilizer compound of the core can be released to the environment in a controlled manner when the encapsulated fertilizer is agriculturally applied.

Therefore, in a first aspect, the invention provides an encapsulated fertilizer comprising:

- a core comprising a fertilizer compound,
- a first layer comprising an organic compound, the first layer surrounding the core,
- a second layer surrounding the first layer, comprising a polymer, micronized sulfur and starch,
- a third layer surrounding the second layer and a fourth layer surrounding the third layer, each of said third and fourth layers comprising micronized sulfur and starch.

In embodiments, the fertilizer compound is urea.

In embodiments, the organic compound is selected from the group consisting of a terpene, vegetable oil and glycerol. Preferably, the organic compound is a terpene.

In other embodiments, the polymer is a cationic polymer such as chitosan.

In a specific embodiment, the fertilizer compound is urea, the organic compound is a terpene, and the polymer is chitosan. Even more preferably, the organic compound is a diterpene obtained from lemon and orange.

Preferably, the encapsulated fertilizer comprises 87 to 95% (w/w) nitrogen and 5 to 13% sulfur (w/w).

In other embodiment, the second layer further comprises a solution of an inhibitor in water. Preferably a solution of NBPT inhibitor in water.

In a specific embodiment, the solution has an inhibitor concentration of 1:2-1:8.

The invention further provides a method of preparation of an encapsulated fertilizer, with steps and materials that allow a layer-by-layer construction technique.

Therefore, in a second aspect, the invention provides a method for preparing an encapsulated fertilizer comprising four layers, wherein the method comprises the steps of:

a) providing a core comprising a fertilizer compound, b) spraying a solution comprising an isoprene derivative, thereby forming a first layer, c) adding a solution comprising a polymer and micronized sulfur and sprinkling starch, thereby forming a second layer surrounding the first layer, d) adding a solution comprising a polymer and micronized sulfur and sprinkling starch, thereby forming a third layer surrounding the second layer, and e) adding a solution comprising a polymer and micronized sulfur and sprinkling starch, thereby forming a fourth layer surrounding the third layer.

In preferred embodiments, the method further comprises repeating steps c) to d) at least three times.

In embodiments, the method is carried out at a constant temperature of about 25 to 35° C., so as to minimize the hydrolysis or volatilization of the fertilizer compound.

In preferred embodiments, in step c. the solution comprises a polymer and a solid formulation 1:1-1:10 concentration of starch and micronized sulfur.

In preferred embodiments, in step c. the solution further comprises a solution consisting of an inhibitor and water. Preferably, the inhibitor is N-(n-Butyl)thiophosphoric triamide, and more preferably the inhibitor has a concentration of 1:2-1:8.

This ratio is found to provide a synergistic effect between the polymer and the sulfur microemulsion in the obtained encapsulated fertilizer.

In preferred embodiments, the method further included drying stages after each of the steps b) to e). Preferably, the drying stages are at least 5 min in duration.

DETAILED DESCRIPTION

Figure 1:
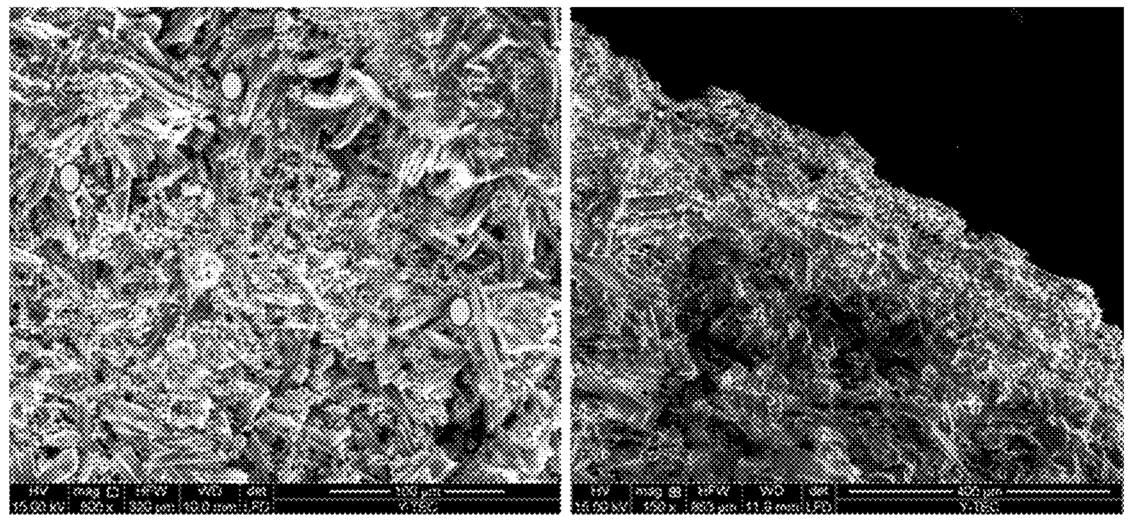
FIG. 1 shows SEM micrographs of fertilizer Prototype A. Right-hand side shows the external surface, left-hand side shows a transversal cut.

The invention will be described in further detail below with reference to the appended figures, included only for illustrative purposes.

Unless stated otherwise, concentrations are expressed as mass ratios.

The fertilizer provided by the present invention is an encapsulated fertilizer, meaning that it comprises a core comprising a fertilizer compound, and layers having different compositions surrounding the core.

In an embodiment, the fertilizer compound is urea, the core is sealed using a terpene solution, and layers comprising micronized sulfur and polymers (i.e. starch and chitosan) are added over the core.

Terpenes are isoprene derivatives of formula $(C_5H_8)_n$ which may be obtained from plants, such as conifers, or industrially synthesized. In the context of the present invention, terpenes in the encapsulated fertilizer act as a hydrophobic barrier, preventing water to migrate from the external layers to the internal layers, thereby protecting the fertilizer compound, e.g. urea, from dissolution.

Micronized sulfur is provided in the form of sulfur microemulsions, which are formulated according to the mineral requirements of a plant. These sulfur microemulsions typically comprise micronized sulfur having an average particle size of up to 9 μm, as well as other chemical species such as carbonates, sulfates and phosphates.

The starch is added by sprinkling to the different layers in the encapsulated fertilizer. Sprinkling or pulverization of starch has a double function: capturing the moisture in the sprayed solutions and conferring elasticity to the encapsulated system, thereby creating stability and allowing a layer-by-layer deposition without preferential paths or channels.

The polymer is added to the encapsulated fertilizer in a solution further comprising a sulfur microemulsion. A 50/50 volume ratio of the solution comprising the polymer and the microemulsion provides an increased synergy between both compounds, allowing the layers to have more adherence, elasticity and avoiding the formation of cracks or fractures.

The temperature throughout the whole process should not be increased above 30° C.

In embodiments, an inhibitor is added to the encapsulated fertilizer. Suitable inhibitors for the encapsulated fertilizer provided by the invention comprise compounds that are inhibitors of the enzyme urease, such as N-(n-Butyl)thiophosphoric triamide, which limit the release of nitrogen-containing gases following fertilization. In the context of the present invention, adding an inhibitor has a doble function: synergizing the formation of the layers of the encapsulated fertilizer and controlling the loss of urea.

The solid mixture of sulfur and starch is added to increase the stability between the layers.

EXAMPLES

Materials and Methods

The synthesis of encapsulated fertilizers of the invention was carried out using granular urea provided by Profertil (Argentina).

A 4% in weight chitosan solution was prepared, using a 4% in volume HCl solution for acidification.

Several encapsulated fertilizer prototypes were prepared, as described below.

i. Prototype A

In order to obtain a first fertilizer prototype, prototype A, i.e. fertilizer based on urea and a sulfur microemulsion, the microemulsion was sprayed over the urea crystals. SEM micrographs show that the layer of sulfur deposited over the urea, as shown in FIG. 1, displays heterogeneity throughout the surface, and that preferred paths or channels from the center of the particle towards the outside (i.e. external surface) were formed. This is due to two phenomena: on the one hand, the sulfur microemulsion is not elastic upon drying, causing discontinuities and fractures on the surface. On the other hand, sustained heating causes urea sublimation, which can be seen in the urea crystals (highlighted in yellow in FIG. 1) at the surface of the encapsulated fertilizer.

The coating of the first fertilizer prototype was characterized using X-Ray diffraction analysis (XRD) and elemental analysis to obtain information about the mineral composition, both crystalline and total. A "layer-by-layer" Z-potential determination was also carried out, in order to assess the use of polymers, both with the polymer being mixed in the microemulsion solution or as a layer in the encapsulated system.

The results for the mineral content of the microemulsion solution are shown in Table 1 below.

The Z-potential analysis for the same sample yielded a negative value of 38 mV.

From these results, it was concluded that the polymers used in the encapsulation system must possess a positive charge, i.e. the monomers forming the polymeric chain should have cationic functional groups, in order for the coating to be more effective and cohesive.

The polymer selected for the subsequent fertilizer prototypes was chitosan, which is soluble in acidified water having several advantageous structural properties and useful as fungicide/bactericide, etc.

ii. Prototype B 30 mL of a solution prepared with chitosan and a sulfur emulsion (50/50 by volume) were added over the surface of 1 kg of granular urea. The polymer exerted a support function and added elasticity to the system, allowing closing of the superficial microfractures seen in Prototype A, thereby obtaining a second fertilizer prototype, i.e. Prototype B.

Figure 2:
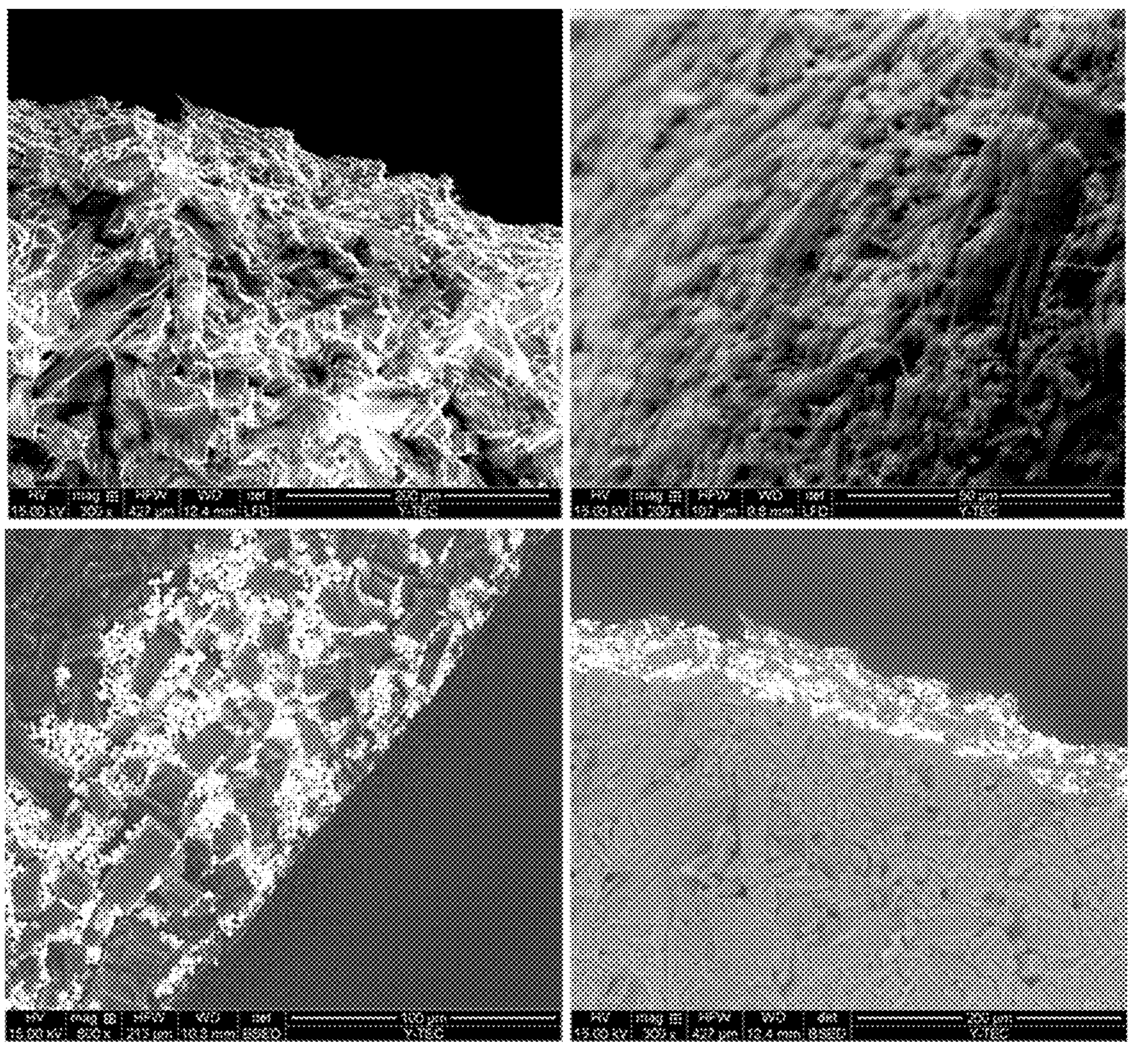
FIG. 2 shows SEM micrographs of fertilizer Prototype B. Top represents the external surface, bottom is a transversal cut. White areas correspond to sulfur in the chitosan solution while gray areas correspond to crystalline urea.
Figure 3:
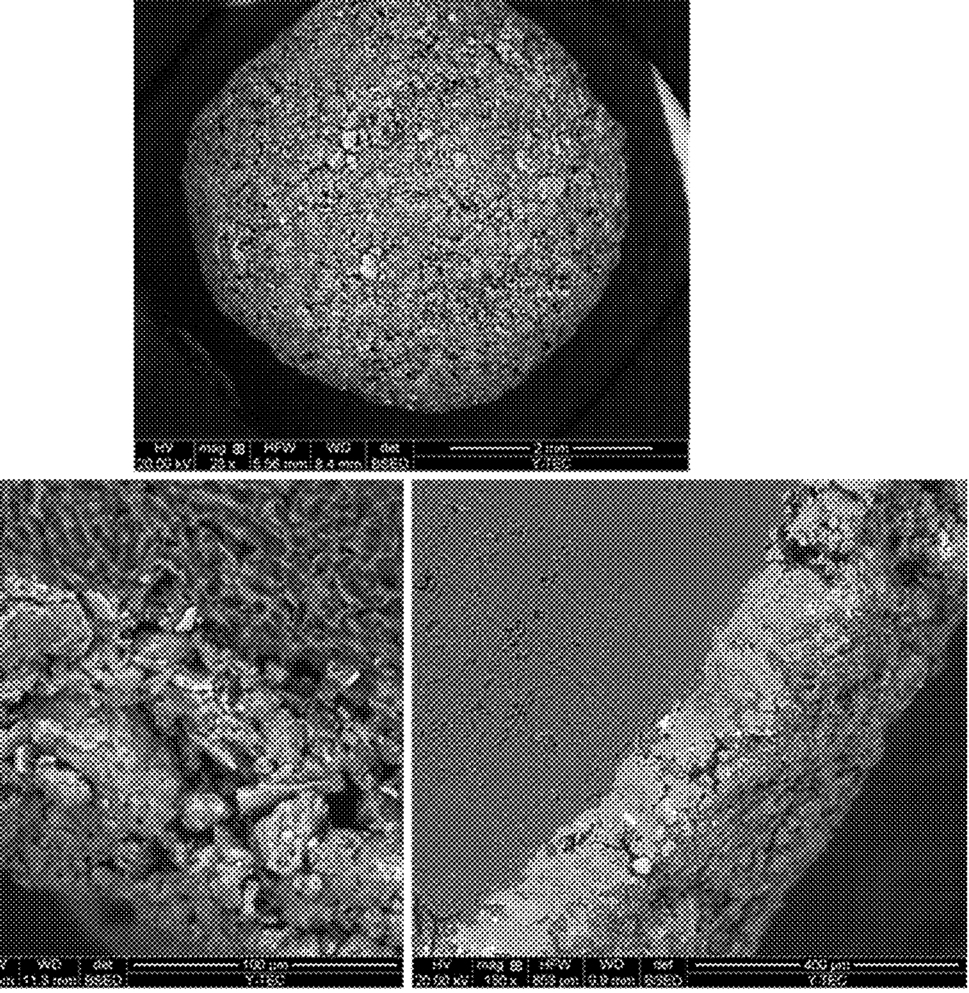
FIG. 3 shows SEM micrographs of fertilizer Prototype C. Top represents the external surface, bottom is a transversal cut.

FIG. 2 shows that the external surface of Prototype B comprises a network provided by the adding of the polymer to the solution homogenously coating the surface. The migration of urea to the surface in crystal form can also be seen. This phenomenon may be attributed to the presence of water in the solution, which generates paths or channels by dissolution of the urea, allowing it to dissolve and migrate towards the surface of the encapsulated fertilizer.

iii. Prototype C 30 g of bentonite were added to the system in order to capture the humidity generated by the spraying of the chitosan solution and the sulfur microemulsion. FIG. 3 shows that adding bentonite causes rupture of the elastic layer, since it affects chitosan elasticity. In addition, even though it has a humidity absorption function, it generates preferred paths or channels towards the surface for urea.

iv. Prototype D

In order to avoid migration of urea to the coating surface, the addition of an oily and organic material was carried out as a first layer over the urea, i.e. a terpene, glycerol and vegetable oil. 35-45 mL of terpene were used in this prototype. 10-20 g of starch were used instead of bentonite, since it has a similar function of absorbing moisture and providing elasticity to the system.

Several concentrations of the chitosan and sulfur microemulsion solutions were tested (40/60 and in volume).

Figure 4:
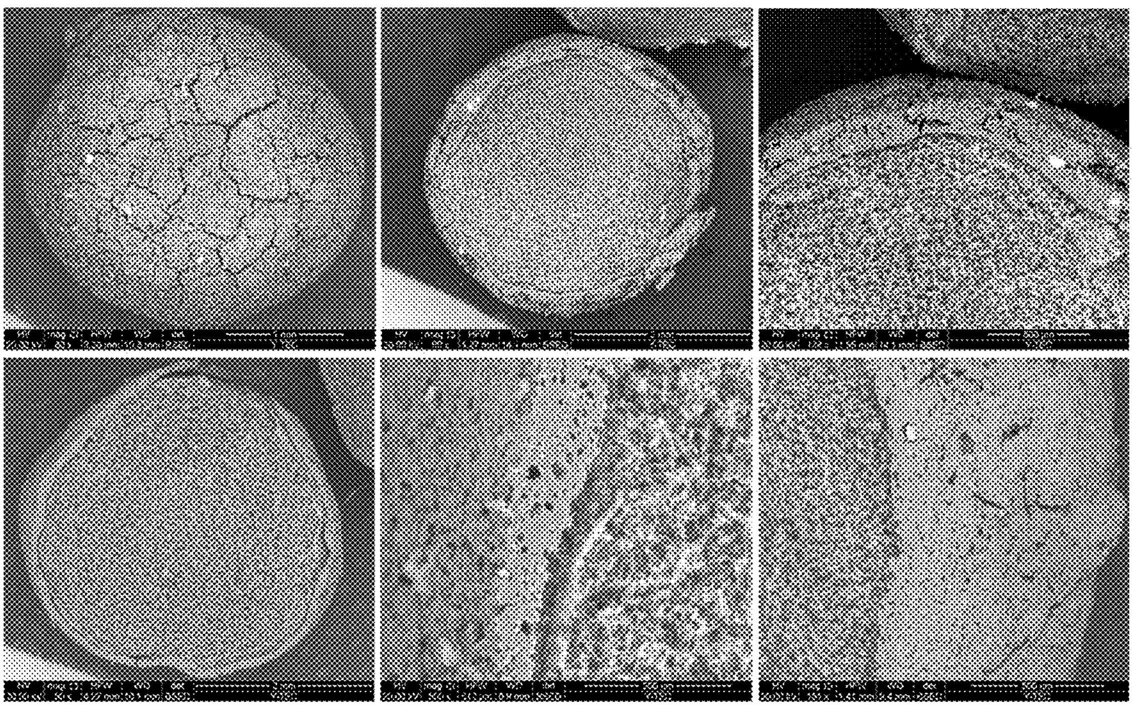
FIG. 4 shows SEM micrographs of fertilizer Prototype D. Top represents the external surface and transversal cut profiles for a system using a lower polymer concentration, bottom is a transversal cut for a system using a polymer concentration at a 50/50 in volume ratio.

In FIG. 4, it can be seen that at a lower chitosan content in the coating solution, the system becomes fragile compared to systems in which a 50/50 relation was used. It can also be observed that, while pores between the layers exist, they are not communicated between one another, avoiding the creation of preferential paths.

v. Prototype E

Considering the results obtained in the XRD analysis shown in Table 1, it can be seen that the sulfur content in Prototype D is not suitable for a final product.

1 kg of granular urea was coated with 35-45 mL of terpene and subsequently pulverized with 10-20 g of starch. Finally, three consecutive layers of the chitosan/microemulsion solution at a 50/50 ratio in volume were added, intercalated by starch spraying and drying for 5 min.

Figure 5:
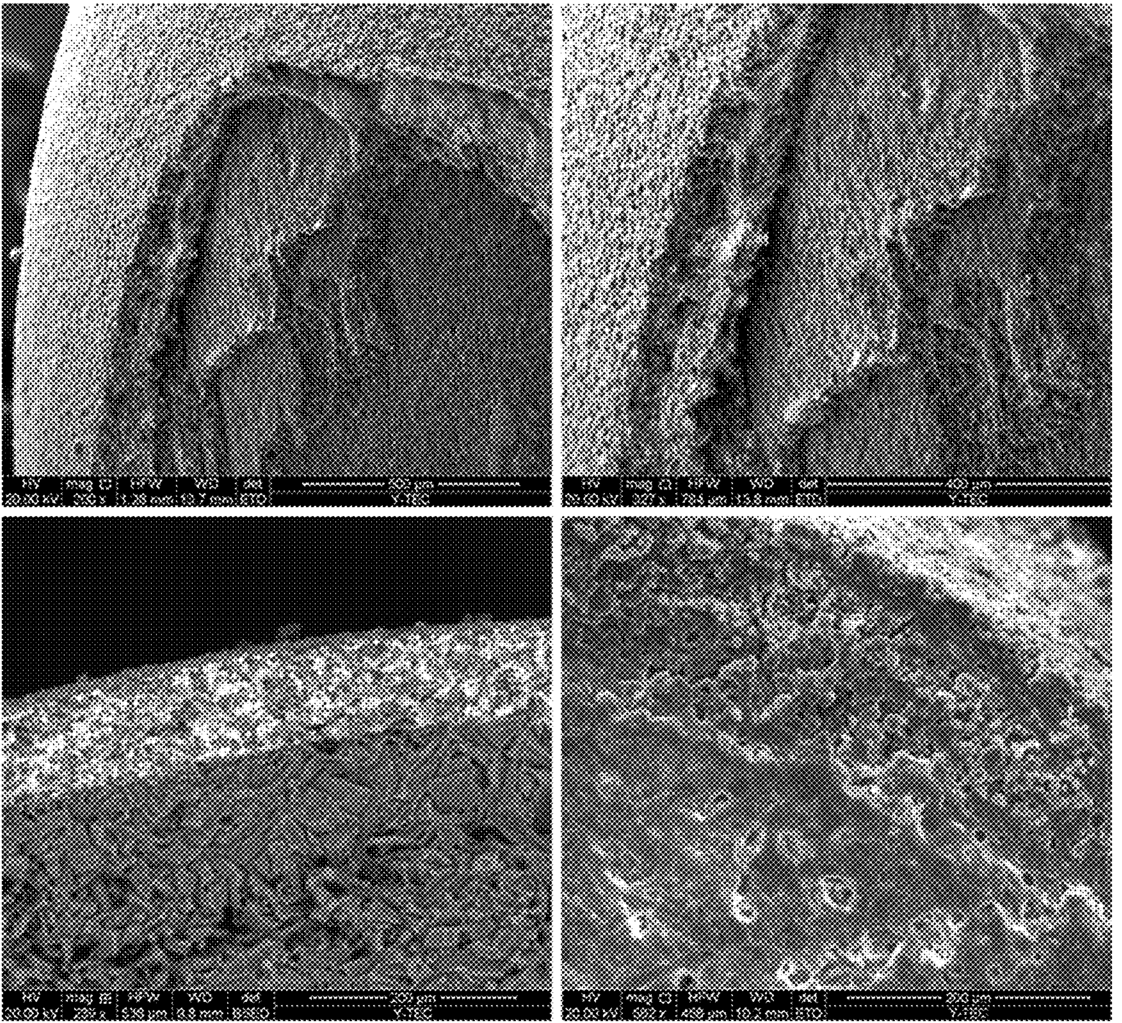
FIG. 5 shows SEM micrographs of fertilizer Prototype E. Top represents the external surface, bottom is a transversal cut.

The top of FIG. 5 shows that the added layers become stratified, while the bottom shows the fragility of the system, displaying preferential paths for the migration of urea to the external surface.

vi. Prototype F

To 1 kg of granular urea were added 35-45 mL of terpene, followed by sprinkling of 10-20 g starch (Layer 1). Subsequently, 25-35 mL of the enhanced micro emulsion solution (s+) was sprayed and starch was added (Layer 2). The spraying of 25-35 mL of the enhanced micro emulsion solution (s+) and starch was then repeated (Layer 3). Finally, an additional layer of 25-35 mL of a solution comprising the chitosan and the enhanced microemulsion solution (s+) at a ratio of 50/50 in volume was added, followed by sprinkling with starch (Layer 4).

The sequence of layers 2, 3 and 4 was repeated three consecutive times.

The temperature remained constant throughout the process, at 25-30° C. The layers were dried during 5 min each.

Figure 6:
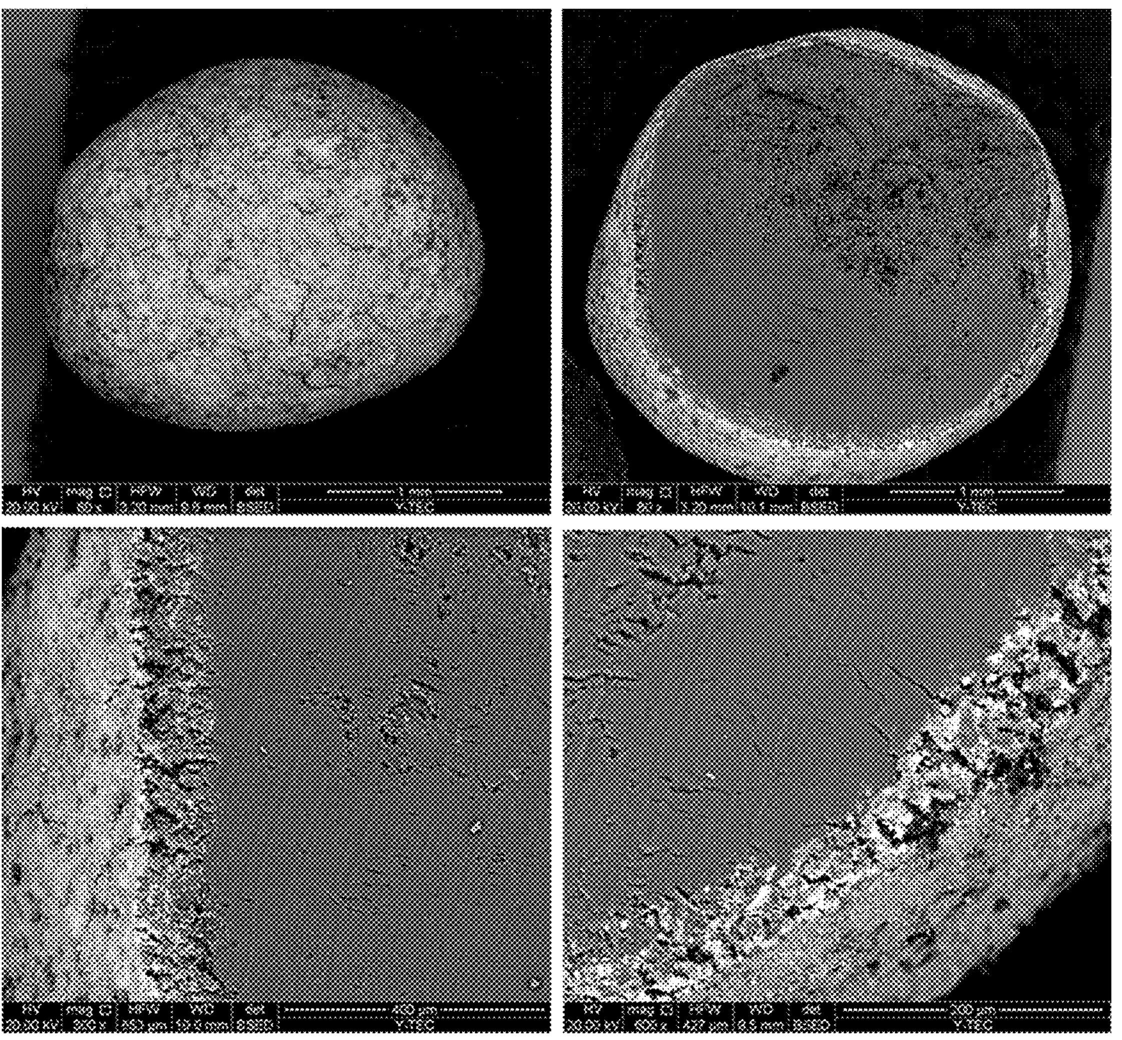
FIG. 6 shows SEM micrographs of fertilizer Prototype F. Top represents the external surface, bottom is a transversal cut.

FIG. 6 shows that cracks formed within the system and the system fragility, as shown by the presence of preferential paths or channels for the migration of urea from the center to the external surface.

vii. Prototype G

To 1 kg of granular urea were added 35-45 mL of terpene, followed by sprinkling of 10-20 g starch (Layer 1). Subsequently, 25-35 mL of a solution comprising chitosan and the enhanced microemulsion solution at a ratio of 50/50 in volume was added, followed by starch sprinkling (Layer 2). Then, 25-35 mL of the enhanced micro emulsion solution (s+) was sprayed and starch was pulverized (Layer 3). The layer of enhanced micro emulsion solution (s+) and starch was repeated (Layer 4).

The sequence of layers 2, 3 and 4 was repeated three consecutive times.

The temperature remained constant throughout the process, at 25-30° C. The layers were dried during 5 min each.

Figure 7:
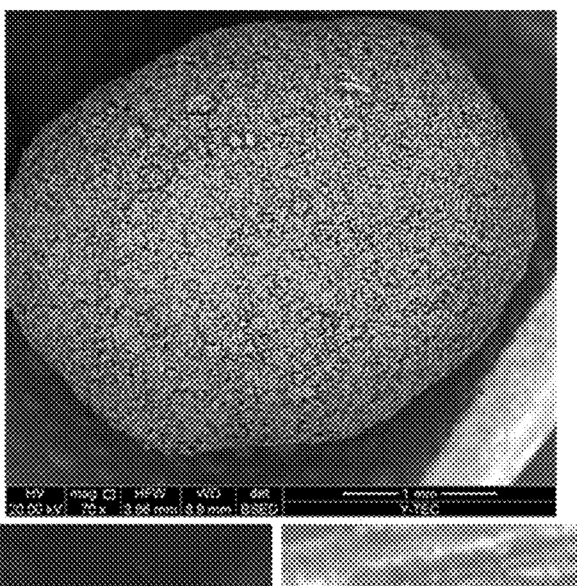
FIG. 7 shows SEM micrographs of fertilizer Prototype G. Top represents the external surface, bottom is a transversal cut.
Figure 7:
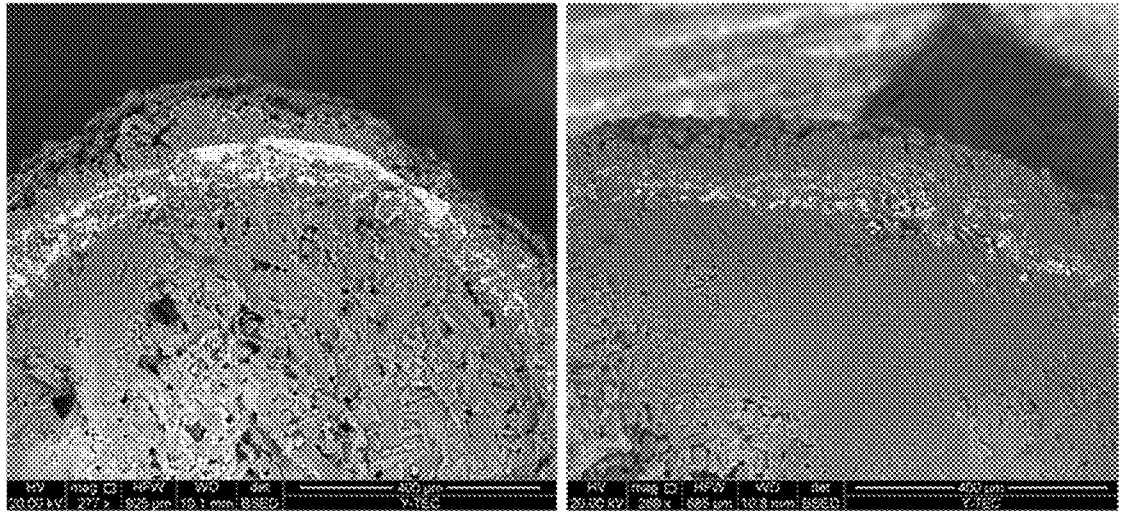

FIG. 7 shows that the resulting encapsulated fertilizer displays a homogeneous external surface, as well as cohesion between the different layers, resulting in a stable system.

viii. Prototype H (Scale-Up)

To 100 kg of granular urea were added 1000-1500 mL of terpene, followed by sprinkling of 500-700 g starch (Layer 1). Subsequently, 500-700 mL of a solution comprising chitosan and the enhanced microemulsion solution at a ratio of 50/50 in volume was added, followed by starch sprinkling (Layer 2). Then, 2-5 L of the enhanced micro emulsion solution (s+) was sprayed and 1-1.5 kg of starch were pulverized (Layer 3). The layer of enhanced micro emulsion solution (s+) and starch was repeated (Layer 4).

Figure 8:
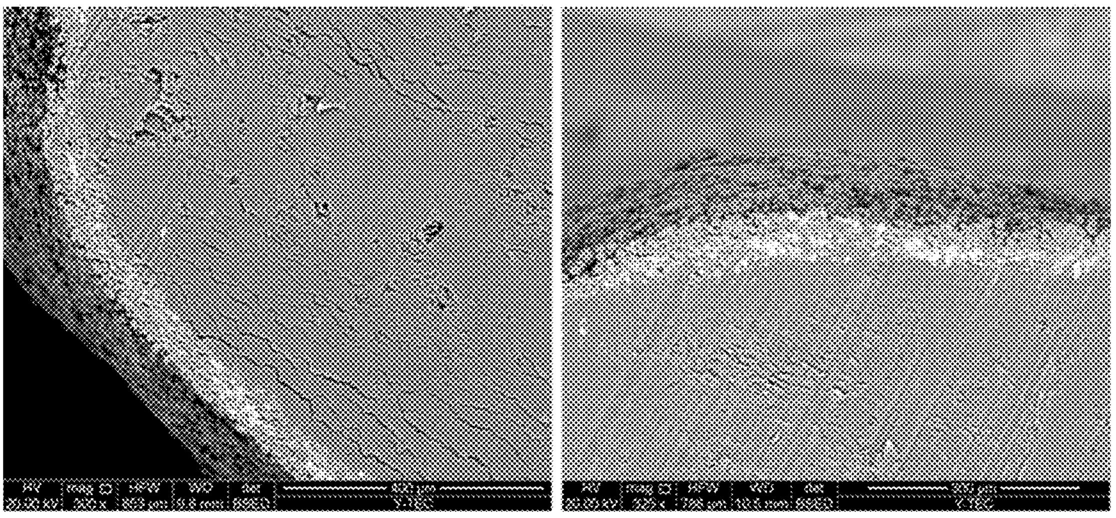
FIG. 8 shows SEM micrographs of fertilizer Prototype H. Top represents the external surface, bottom is a transversal cut.

FIG. 8 shows that the resulting encapsulated fertilizer displays a homogeneous external surface, as well as cohesion between the urea and the different layers, resulting in a stable system. No preferential paths or channels for urea can be seen. The stability of Prototype G was successfully maintained in the scaling-up process.

ix. Prototype I

To 100 kg of granular urea were added 340-450 mL of a solution comprising an isoprene derivative, followed by sprinkling of 500-700 g starch (Layer 1). Subsequently, a solution 1:2-1:8 of an N-(n-Butyl)thiophosphoric (NBPT) inhibitor in water was added (Layer 2), followed by a solid formulation 1:1-1:10 of starch and micronized sulfur, which is not soluble in aqueous phase, (Layer 3). Then, the sequence of layers 2 and 3 was repeated two consecutive times, finishing with a layer of Layer 2.

The temperature remained constant throughout the process, at 25-30° C. The layers were dried during 3 min, between each layer.

Figure 9:
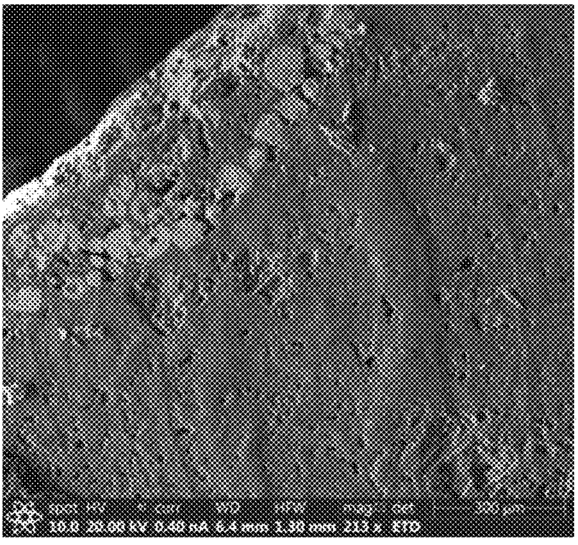
FIG. 9 shows SEM micrographs of fertilizer Prototype I. Top represents the external surface, bottom is a transversal cut.

FIG. 9 shows that the resulting encapsulated fertilizer displays a homogeneous external surface, as well as cohesion between the urea and the different layers, resulting in a stable system. No preferential paths or channels for urea can be seen. The stability of Prototype G was successfully maintained with an independent formulation.

x. Prototype J (Scale-Up)

To 1000 kg of granular urea were added 1000-3000 mL the solution comprising an isoprene derivative following by sprinkling of 1000-2700 kg (Layer 1). Subsequently, a solution 1:2-1:8 of the NBPT inhibitor in water was added (Layer 2), followed by a solid formulation 1:1-1:10 of starch and micronized sulfur, which is not soluble in aqueous phase, (Layer 3). Then, the sequence of layers 2 and 3 was repeated two consecutive times, finishing with a layer of Layer 2.

The temperature remained constant throughout the process, at 25-30° C. The layers were dried during 3 min each.

Figure 10:
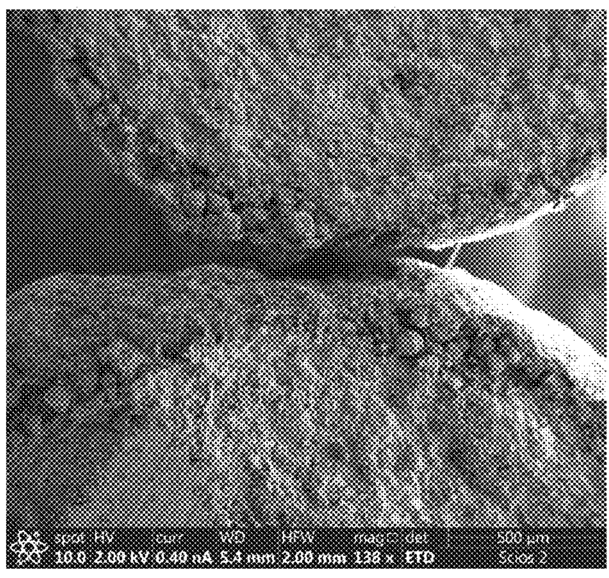
FIG. 10 shows SEM micrographs of Prototype J. Top represents the external surface, bottom is a transversal cut.

FIG. 10 shows that the resulting encapsulated fertilizer displays a homogeneous external surface, as well as cohesion between the urea and the different layers, resulting in a stable system. No preferential paths or channels for urea can be seen. The stability of Prototype I was successfully maintained in the scaling-up process.

TABLE 1

Results of XRD analysis for Prototypes A to G

| Prototype | Quantification by XRD (% w/w) |
|---|---|
| A | N (93%) S (7%) |
| B | — |
| C | — |
| D | N (97%) S (3%) |
| D | N (95%) S (5%) |
| E | N (94%) S (6%) |
| F | N (95%) S (5%) |
| G | N (93%) S (7%) |
| H | N (87%) S (13%) |
| I | N (95%) S (5%) |
| J | N (95%) S (5%) |

The invention claimed is:

1. An encapsulated fertilizer comprising:

a core comprising a fertilizer compound, a first layer comprising an organic compound, the first layer surrounding the core, a second layer surrounding the first layer, said second layer comprising a polymer, micronized sulfur and starch, a third layer surrounding the second layer and a fourth layer surrounding the third layer, each of said third and fourth layers comprising micronized sulfur and starch.

2. The encapsulated fertilizer of claim 1, wherein the organic compound is a terpene.

3. The encapsulated fertilizer of claim 2, wherein the fertilizer compound is urea and the polymer is chitosan.

4. The encapsulated fertilizer of claim 1, wherein at least one of the layers further comprises an inhibitor.

5. The encapsulated fertilizer of claim 4, wherein the inhibitor is N-(n-Butyl) thiophosphoric triamide.

6. A method for preparing an encapsulated fertilizer comprising four layers, wherein the method comprises the steps of:

a) providing a core comprising a fertilizer compound, b) spraying a solution comprising an organic compound, thereby forming a first layer, c) adding a solution comprising a polymer and micronized sulfur and sprinkling starch, thereby forming a second layer surrounding the first layer, d) adding a solution comprising micronized sulfur and sprinkling starch, thereby forming a third layer surrounding the second layer, and e) adding a solution comprising micronized sulfur and sprinkling starch, thereby forming a fourth layer surrounding the third layer.

7. The method of claim 6, further comprising repeating steps c) to d) at least three times.

8. The method of claim 6, wherein the fertilizer compound is urea, the organic compound is a terpene, and the polymer is chitosan.

9. The method of claim 6, wherein the method is carried out at a constant temperature of about 25 to 30° C.

10. The method of claim 6, wherein in step c. the solution further comprises a solution consisting of an inhibitor and water.

11. The method of claim 10, wherein in step c. the inhibitor is N-(n-Butyl) thiophosphoric triamide.

12. The method of claim 6, further including drying stages after each of the steps b) to e).

13. The method of claim 12, wherein the drying stages are each at least 5 min in duration.

* * * * *